United States Patent [19]

Mandel et al.

[11] Patent Number: 4,913,835

[45] Date of Patent: Apr. 3, 1990

[54] COMPOSITIONS AND METHOD FOR NEUTRALIZATION AND SOLIDIFICATION OF HAZARDOUS ALKALI SPILLS

[75] Inventors: Frederick S. Mandel; James A. Engman, both of Marinette; Wayne R. Whiting, Oconto, all of Wis.; James Nicol, Plano, Tex.

[73] Assignee: Wormald U.S. Inc., Marinette, Wis.

[21] Appl. No.: 185,797

[22] Filed: Apr. 25, 1988

Related U.S. Application Data

[63] Continuation-in-part of Ser. No. 29,845, Mar. 31, 1987, abandoned, which is a continuation-in-part of Ser. No. 859,122, May 2, 1986, abandoned.

[51] Int. Cl.$^4$ ............................ C09K 3/00; A62C 1/00; A62C 35/00; C02F 1/42
[52] U.S. Cl. ......................................... 252/190; 169/9; 169/43; 169/71; 210/680; 210/751; 210/925; 252/189; 252/192; 252/315.1; 252/628; 252/631
[58] Field of Search ................ 257/678, 631, 189, 190, 257/193, 8; 169/43-47, 9, 71; 106/74, 76, 78, 89, 97, 98, DIG. 2, DIG. 4; 210/680, 925, 922, 751; 134/3, 28, 40

[56] References Cited

U.S. PATENT DOCUMENTS

| | | | |
|---|---|---|---|
| 3,042,622 | 7/1962 | Kirschenbauer | 252/190 |
| 3,090,749 | 5/1963 | Warnock | 252/2 |
| 3,196,106 | 7/1965 | Haden, Jr. et al. | 252/631 |
| 3,708,429 | 1/1973 | Hall | 252/156 |
| 3,837,872 | 9/1974 | Conner | 106/74 |
| 3,980,558 | 9/1976 | Thompson | 61/35 |
| 4,095,988 | 6/1978 | Jancek et al. | 106/97 |
| 4,105,576 | 8/1978 | Seidenberger | 252/190 |
| 4,174,292 | 11/1979 | Seidenberger et al. | 252/189 |
| 4,207,116 | 6/1980 | Been et al. | 106/97 |
| 4,234,432 | 11/1980 | Tarpley, Jr. | 252/8 |
| 4,249,949 | 2/1981 | Wooler et al. | 106/90 |
| 4,346,012 | 8/1982 | Umaba et al. | 252/7 |
| 4,524,835 | 6/1985 | Mingrone | 169/65 |

*Primary Examiner*—Howard J. Locker
*Attorney, Agent, or Firm*—Morgan & Finnegan

[57] ABSTRACT

This invention relates to novel compositions and methods for neutralization and solidification of hazardous alkali spills. A dry particulate composition containing an organic neutralizing acid and, materials having varying adsorption rates may be used to neutralize alkaline spills, and solidify the spills to render them harmless. These compositions may be applied to the spills by fire-extinguisher-like delivery devices which spread the compositions on the spills from a relatively safe distance without splattering the hazardous materials.

15 Claims, No Drawings

COMPOSITIONS AND METHOD FOR NEUTRALIZATION AND SOLIDIFICATION OF HAZARDOUS ALKALI SPILLS

BACKGROUND OF THE INVENTION

This application is a continuation-in-part of application Ser. No. 07/029,845, filed 3/31/87, abandoned, which is in turn a continuation-in-part of application Ser. No. 06/859,122 filed 5/2/86 now abandoned, which is hereby incorporated herein by reference.

FIELD OF THE INVENTION

This invention relates to novel compositions and the novel methods of their use for neutralization and clean-up of hazardous alkali spills.

PRIOR ART

Various compositions have been known in the past to be useful for the neutralization of alkali waste materials. Some prior art references describe methods for neutralizing alkali spills. However, these prior art compositions and methods for alkali waste neutralization entail certain disadvantages in situations in which alkali compositions spill in an industrial plant or similar cases.

U.S. Pat. No. 3,042,622 (Kirschenbauer) describes an abrasive cleaning composition comprising a mixture of a water-insoluble abrasive cleaning composition comprising a mixture or a water-insoluble abrasive material and an alkaline ingredient, and an acidic ingredient. The composition exhibits both alkaline and acidic cleansing properties in water. The abrasive agents used in the composition include siliceous materials including silex, tripoli, pumice, volcanic ash, pumicite, bentonite, diatomaceous earth, feldspar and the like. The composition may also include a water-soluble acidic ingredient, including citric acid (column 2, line 45). These abrasive compositions may be used for cleaning, such as in scouring powders, and for the removal of stains from metal surfaces. However, these compositions are useful as abrasives for cleansing, and cannot be applied to hazardous spill control.

U.S. Pat. No. 3,708,429 describes cleaning compositions comprising a substantially anhydrous mixture of (a) a surface active agent, (b) an alkaline catalyst, (c) an acid release agent, and (d) a lower aliphatic alcohol. The acid release agent can be encapsulated using an encapsulating material which is stable in the anhydrous composition, but which dissolves or disperses in water in order to activate the acidic material inside. The acid release agents useful in this composition includes citric acid, glutaric acid and tartaric acid, as well as acid salts. This patent also states that the acidic materials may be absorbed onto solid carrier materials, e.g. acetic acid absorbed onto bentonite. These compositions are described as being useful for cleaning fatty soil from dishes and for dishwashing compositions which are used diluted in water, rather than for hazardous spill neutralization.

U.S. Pat. No. 4,105,576 (Seidenberger) is directed to the control and clean-up of liquid caustic spills by neutralization and absorption into a granular composition formed from citric acid, expanded perlite, flour, fumed silica, a pH indicator dye and water. The composition is prepared by adding the pH indicator to deionized water, charging a blender with citric acid monohydrate through a crusher to break up lumps, and charging the blender with perlite. The pH indicator solution is poured in a substantially even fashion over the surface of the perlite and the components mixed for about twenty minutes. Flour is added to the mixture and blended such that the flour coats and partially dries the formulation. Fumed silica is then added and the composition blended to provide a homogeneous blend. The blend is then ready to absorb caustic spills. However, this method produces particles which are unsuitable for application to the spill from a safe distance.

SUMMARY OF THE INVENTION

This invention is directed to a novel composition and method of using the composition to neutralize and solidify hazardous alkali spills so as to prevent the spread of such a spill by absorption, neutralization and solidification from a safe distance away from the spill. The compositions of this invention limit the absorption rate so as to enable the maximum amount of alkali material to react and be neutralized.

The mode of application of the method of this invention allows the control and neutralization of hazardous spills from a distance without causing splashing of the hazardous materials during neutralization.

The novel compositions of this invention are in the form of fluidized powders dispensable from a portable delivery device in a directable collimated stream and contain the following: about 45 to 75% organic neutralizing acid, about 5 to 45% of a highly absorptive clay, optionally about 10 to 45% of a less absorptive clay and about 0.5 to 10% weak water-soluble acid.

The novel compositions of this invention may be applied to a hazardous acidic spill through a delivery device similar to a fire extinguisher. The compositions are fluidized in the form of small particles of varying sizes, but within a narrow size distribution. Preferably, they have a predominant size distribution in the range between −40 to +200 Tyler screen mesh range. The fluidized composition is dispensable under pressure from a portable delivery device in a collimated directable stream from a distance of about 10 to 15 feet without splashing to avoid endangering the worker who is assigned to treat the hazardous alkali spill.

The compositions of this invention may be made by mixing the components in a blender. Where the composition contains only highly absorptive clay together with the acids and does not contain the less absorptive clay, the components are preferably mixed at an elevated temperature in the range of about 75° C. to 105° C. in a blender.

DETAILED DESCRIPTION OF PREFERRED EMBODIMENTS

The compositions of this invention preferably contain between about 45% and about 80% by weight of organic neutralizing acid in a dry particulate form such as citric acid, fumaric acid, tartaric acid or benzoic acid, between about 5% to about 45% by weight of a highly absorptive clay such as attapulgite, perlite, fullers earth or Minugel ® and the like, optionally between about 10% to about 45% by weight of less absorptive clay, such as attapulgus clay and the like and between about 0.5% and about 10% by weight of a water soluble weak acid salt such as sodium dihydrogen phosphate, magnesium stearate, tricalcium phospate, aluminum octoate, sodium stearate, monosodium salt of dimethyl naphthalene sulfonate, sodium polyacrylate, and the like.

The organic neutralizing acid component of the compositions of this invention serve to neutralize, absorb and solidify the alkali spills to which they are applied. After treatment, they are amenable to safe clean-up. The organic neutralizing acid may be any organic acid which is in a dry particulate form at room temperature, such as citric acid, tartaric acid, benzoic acid or fumaric acid or a combination of such acids. Such acids are relatively insoluble. Dry particulate acids are preferable so that the composition may be dispensed readily from a distance in a fire extinguisher-like delivery device in the appropriate dispersion pattern.

The absorptive clays which are present in the composition aid in absorbing and containing the hazardous alkaline materials so as to allow the acid component to react with and neutralize them. Different clays having varying degrees of absorption rates can be used so that the largest possible proportion of the alkaline materials may be given the opportunity to react and neutralize. Hence, a mixture of a highly absorptive clay component having an absorption capacity of 60% to 99% by weight of water and a less absorptive clay component having an absorption capacity of 33.8% to 51% by weight of water have been found to be useful in the composition. Highly absorptive clays include Minugel-200 ®, some attapulgites, perlites and fullers earth. Less absorptive clays include certain attapulgus clays and the like. However, compositions which contain only one highly absorptive clay, in particular attapulgite, have also found to be useful.

The absorptive capacity of the clay component is determined as follows.

About 20 ml of distilled water, or enough water to allow for some remaining free water, is added to 10 g. of a clay sample in a beaker. The mixture is allowed to stand for 30 min. and free unabsorbed water is removed by filtration. The amount of water absorbed by the clay is analyzed by thermogravimetric analysis.

Using this method the absorbancy of various clays were determined. The results are as follows:

| Sample | Absorbancy of Clays | |
|---|---|---|
| | % Solids Remaining | % Water Absorbed |
| Attapulgus Clay (Englehardt) 1. | 55.28 | 44.7 |
| Attaclay 100/200 (Englehardt) 2. | 49.00 | 51.0 |
| | 39.56 | 60.4 |
| Minugel 200 ® | 17.22 | 82.8 |
| Mica | 66.22 | 33.8 |
| Fullers Earth | 37.78 | 66.2 |
| Bentonite | 57.22 | 42.8 |
| J-550 | <1 | >99 |

These compositions are preferably mixed in a heated blender at a temperature in the range of 75° C. to 105° C., preferably 105° C.±5° C. Such compositions are exemplified in Examples 18–26 below.

A small amount of water-soluble, weak acid salt in the compositions of this invention functions to produce heat by reacting with the bases in the spill to allow the organic neutralizing acid to react more readily (these reactions provide heat of neutralization for the citric acid/hazardous alkali reaction). Because the spill may be absorbed quickly and thus be removed from the areas where it may freely react with the neutralizing acid, a small amount of a water soluble weak acid salt is desirable to increase the speed of reaction. This weak acid salt also generates some heat by reacting with the alkaline materials in the spill, thus providing the heat of solubilization for the sparingly-soluble organic neutralizing acids and increasing their opportunities to react with the base.

Dyes which change colors with pH may be added to exemplify the neutralization reaction as it progresses.

The compositions of this invention in the form of a fluidized powder and are preferably applied to the hazardous spills from a fire-extinguisher-like vessel. They are preferably applied in the dry form in which they are stored. They may be store under pressure until used in a pressurized vessel or they may be stored in an unpressurized vessel and pressurized by external gas through an external expellent gas cartridge.

The size distribution of the particles of the compositions of this invention allows them to be applied to spills in a "soft" pattern, i.e. relatively spread out such that they cover a spill as it spreads without splattering the spill. The compositions are applicable from a distance of about 10 to 15 feet. The nozzle velocity should be between about 30 and 50 feet/second. In order to achieve this velocity, the particles should have a size distribution between $-40$ and $+200$ Tyler screen mesh size.

The particulate compositions of this invention may be applied on a nitrogen gas stream. The particular specified size distribution will substantially assure the appropriate flow rate and delivery pattern.

The compositions of this invention contain both relatively less reactive organic acids and water soluble weak acids salts such as sodium dihydrogen phosphate. The sodium dihydrogen phosphate, for example, acts as a catalyst to aid the neutralization reactions. This facilitates neutralization of many alkali materials which may have a higher heat of neutralization than others, and allows for a controlled and complete neutralization reaction.

EXAMPLES

An example of a compositon for use in the method of this invention is the following: 70% citric acid, 15% Minugel-200 (available from Fluoriden Co.), 10% attapulgus clay and 5% sodium dihydrogen phosphate. When delivered to a spill of 2.52 gallons of 50% sodium hydroxide, 32.35 pounds of the neutralizing compositon will neutralize the spill completely. This composition can neutralize a variety of alkaline compounds.

The following Examples set forth various compositions of this invention which can be used to neutralize, absorb and solidify alkali spills. They serve to illustrate, but are not to be construed to limit the claimed invention.

| Example 1 | Example 9 |
|---|---|
| 69.5% Citric Acid | 80.0% Citric Acid |
| 15.0% Fullers Earth | 9.25% Fullers Earth |
| 15.0% Minugel 200 ® | 9.25% Minugel 200 ® |
| 0.5% Magnesium Stearate | 1.5% TCP |

| Example 2 | Example 10 |
|---|---|
| 75.0% Citric Acid | 75.0 Citric Acid |
| 6.0% Fullers Earth | 6.0% Fullers Earth |
| 18.5% Minugel 200 ® | 18.5% Minugel 200 ® |
| 0.5% Magnesium Stearate | 1.5% TCP |

| Example 3 | Example 11 |
|---|---|
| 70.0% Citric Acid | 75.0% Citric Acid |
| 7.5% Fullers Earth | 6.5% Fullers Earth |
| 22.5% Minugel 200 ® | 15.5% Minugel 200 ® |
| 4.09 g Red dye #60 | 3.0% TCP |

| Example 4 | Example 12 |
|---|---|
| 75.0% Citric Acid<br>6.5% Fullers Earth<br>18.5% Minugel 200 ®<br>6.81 g Red dye #60 | 75.0% Citric Acid<br>6.5% Fullers Earth<br>18.0% Minugel 200 ®<br>0.5% TCP |

| Example 5 | Example 13 |
|---|---|
| 80.0% Citric Acid<br>10.0% Fullers Earth<br>10.0% Minugel 200 ® | 80.0% Citric Acid<br>10.0% Fullers Earth<br>10.0% Minugel 200 ®<br>0.5% Aluminum Octoate |

| Example 6 | Example 14 |
|---|---|
| 70.0% Citric Acid<br>22.5% Fullers Earth<br>7.5% Minugel 200 ® | 80.0% Citric Acid<br>9.75% Fullers Earth<br>9.75% Minugel 200 ®<br>0.5% Sodium Stearate |

| Example 7 | Example 15 |
|---|---|
| 80.0% Citric Acid<br>9.8% Fullers Earth<br>9.8% Minugel 200 ®<br>0.4% Magnesium Stearate | 80.0% Citric Acid<br>9.75% Minugel 200 ®<br>9.75% Attapulgus Clay<br>0.5% Aluminum Octoate |

| Example 8 | Example 16 |
|---|---|
| 80.0% Citric Acid<br>9.8% Fullers Earth<br>9.8% Minugel ®<br>0.4% TCP (Tricalcium phosphate) | 80.0% Citric Acid<br>14.2% Fullers Earth<br>5.3% Attapulgus Clay<br>0.5% Aluminum Octoate |

| Example 17 | Example 26 |
|---|---|
| 80.0% Citric Acid<br>9.75% Minugel 200 ®<br>9.75% Attapulgus Clay<br>0.5% Aluminum Octoate | 60.0% Citric Acid<br>19.0% Fumaric Acid<br>1.0% Starch<br>19.5% Attapulgite Clay<br>0.5% Petro AGS |

| Example 18 | Example 27 |
|---|---|
| 80.0% Citric Acid<br>16.56% Attapulgite Clay<br>3.0% Starch<br>0.5% Polyacrylate | 70.0% Citric Acid<br>7.5% Fullers Earth<br>22.5% Minugel 200 ® |

| Example 19 | Example 28 |
|---|---|
| 80.0% Citric Acid<br>19.5% Attapulgite Clay<br>0.5% Polyacrylate | 80.0% Citric Acid<br>10.0% Fullers Earth<br>10.0% Minugel 200 ® |

| Example 20 | Example 29 |
|---|---|
| 60.0% Citric Acid<br>20.0% Fumaric Acid<br>19.5% Attapulgite Clay<br>0.5% Polyacrylate | 70.0% Citric Acid<br>22.5% Fullers Earth<br>7.5% Minugel 200 ® |

| Example 21 | Example 30 |
|---|---|
| 40.0% Citric Acid<br>40.0% Fumaric Acid<br>19.5% Attapulgite Clay<br>0.5% Petro AGS (mono-sodium salt of dimethyl naphthalene sulfonate) | 80.0% Citric Acid<br>9.8% Fullers Earth<br>9.8% Minugel 200 ®<br>0.4% Mg Stearate |

| Example 22 | Example 31 |
|---|---|
| 20.0% Citric Acid<br>60.0% Fumaric Acid<br>19.5% Attapulgite Clay<br>0.5% Petro AGS | 80.0% Citric Acid<br>9.25% Fullers Earth<br>9.25% Minugel 200 ®<br>1.50% TCP |

| Example 23 | Example 31A |
|---|---|
| 80.0% Fumaric Acid<br>19.5% Attapulgite Clay<br>0.5% Petro AGS | 80.0% Citric Acid<br>9.8% Fullers Earth<br>9.8% Minugel 200 ®<br>0.4% TCP |

| Example 24 | Example 32 |
|---|---|
| 65.0% Citric Acid<br>18.0% Fumaric Acid<br>15.0% Attapulgite Clay<br>2.0% Starch (grain product, modified starch and polyacrylate crystals known commercially as "J-500")<br>0.5% Petro AGS | 75.0% Citric Acid<br>6.0% Fullers Earth<br>18.5% Minugel 200 ®<br>0.5% Mg Stearate |

| Example 25 |
|---|
| 60.0% Citric Acid<br>18.0% Fumaric Acid<br>2.0% Starch<br>19.5% Attapulgite Clay<br>0.5% Petro AGS |

Table I below sets forth the results of tests demonstrating the ability of the compositions of the foregoing Examples 1–32 to absorb, neutralize and solidify alkali spills. In these tests, a specified amount of alkaline material was spilled in an enclosed area. The type of alkali is set out in column 2 of Table I, entitled "Base". The volume of spill is set out in column 3, entitled "Volume (gal)". The compositions of this invention were then applied from a fire extinguisher type dispenser. The inital weight of the neutralize composition, or of "agent", was measured prior to the test and is set forth in column 4 in (pounds)-(ounces). The weight of agent actually discharged was measured after the test, which depends on the size distribution of the particles, is set forth in column 5 entitled "Weight Discharge". The percent discharge in column 6 measures the efficiency of the discharge. The inital pH of the alkali spill measured after dispensing the agent is in column 7. The final pH of the agent/alkali spill mixture was measured after the test reaction took place (column 8). Comments regarding the quality of the resulting solid and the reaction between the composition and alkali material are set forth in column 9.

Table II sets forth average particle size distributions for several of the compositions of this invention.

TABLE I

| Example | Base | Volume (gal) | Wt. Initial lb | oz | Wt. Discharge lb | oz | % Discharge | pH(i) | pH(f) | Solid |
|---|---|---|---|---|---|---|---|---|---|---|
| 1 | NaOH | 2 | 24 | 9 | 22 | 13 | 92.9 | 12.70 | 12.83 | Soft mud; good absorption; fast reaction |
| 2 | NaOH | 2 | 24 | 8 | 23 | 12 | 96.9 | 12.67 | 12.99 | Poor absorption until mixed; fast complete reation |
| 3 | NaOH | 2 | 24 | 4 | 23 | 1 | 95.2 | 13.09 | 12.94 | Solid after setting up |
| 3A | NaOH | 2 | 24 | 8 | 23 | 8 | 95.9 | 8.46 | 10.57 | Liquid until mixed - nice solid; fast, good reation |
| 3B | NaOH | 2 | 23 | 4 | — | | 100 | 11.83 | 13.27 | Applied with shovel |

TABLE I-continued

| Example | Base | Volume (gal) | Wt. Initial lb | oz | Wt. Discharge lb | oz | % Discharge | pH(i) | pH(f) | Solid |
|---|---|---|---|---|---|---|---|---|---|---|
| 3C | NaOH | 1.68 | 24 | 8 | 23 | 8 | 95.9 | 10.07 | 10.63 | Soupy until mixed; good absorption; fast reaction |
| 3D | NaOH | 1.80 | 24 | 8 | 23 | 4 | 94.9 | 12.25 | 12.30 | Good absorption; fast reaction |
| 4 | NaOH | 1.8 | 24 | 8 | 23 | 6 | 95.4 | 12.6 | 12.65 | Solidified with time; fast reaction |
| 4A | KOH | 1.86 | 24 | 4 | 23 | 0 | 94.8 | 6.05 | 5.78 | Fast, complete reaction; moderate heat; poor absorption; |
| 5 | NaOH | 1.86 | 24 | 8 | 23 | 2 | 94.4 | 11.40 | 11.41 | Poor at end of discharge |
| 5A | KOH | 1.78 | 24 | 8 | 22 | 2 |  | 4.93 | 4.72 | Liquid in pan- little solid; fast reaction |
| 6 | KOH | 1.97 | 23 | 6 | 21 | 8 | 92.0 | 5.95 | 5.75 | Very poor discharge; fast reaction; poor absorption |
| 7 | NaOH | 1.90 | 24 | 8 | 22 | 10 | 92.3 | — | — | No reaction |
| 7A | NaOH | 1.98 | 24 | 8 |  | 23 | 93.9 | — | — | No reaction |
| 8 | NaOH | 1.83 | 24 | 8 | 22 | 2 | 90.3 | 6.67 | 6.78 | Reacted before beginning to stir; good absorption and reaction |
| 9 | NaOH | 1.91 | 24 | 8 | 22 | 11 | 92.6 | 12.47 | 12.43 | Poor flow at end of discharge; good absorption and reaction |
| 10 | NaOH | 1.90 | 24 | 8 | 23 | 2 | 94.4 | 11.59 | 12.19 | Poor flow at end of discharge; good absorption and reaction |
| 11 | NaOH | 1.81 | 24 | 8 | 22 | 6 | 95.4 | 10.06 | 9.12 | Solid very hard when dry; good absorption and reaction |
| 12 | NaOH | 1.76 | 26 | 2 | 24 | 10 | 94.3 | 12.16 | 12.60 | Fast reaction - not hot; good absorption |
| 12A | NH4OH | 2.05 | 23 | 12 | 22 | 14 | 96.3 | 4.05 | 3.94 | Cut off ammonia vapors; fast reaction; poor absorption |
| 13 | NaOH | 2.04 | 23 | 11 | 22 | 3 | 93.67 | 12.19 | 12.50 | Better discharge; dustier than Minugel; fast, non-violent reaction |
| 14 | NaOH | 2.01 | 24 | 8 | 15 | 10 | 63.78 | 12.45 | 12.76 | High reaction of short duration |
| 15 | NaOH | 1.98 | 25 | 10 | 24 | 0 | 93.7 | 10.22 | 10.19 | Good range, reacted before mix; non-violent; and absorption |
| 15A | KOH | 1.71 | 23 | 15 | 22 | 1 | 92.2 | 4.75 | 4.52 | Good range; relatively fast, mild reaction |
| 16 | NaOH | 2.05 | 25 | 10 | 23 | 10 | 92.2 | 5.42 | 5.42 | Flow dropped off at end; fast, mild reaction |
| 17 | NaOH | 2.08 | 25 | 12 | 24 | 5 | 94.4 | 12.35 | 12.73 | Good discharge; good reaction and absorption |
| 17A | KOH | 2.15 | 25 | 11 | 24 | 5 | 94.7 | 4.02 | 4.05 | Fast, mild reaction; poor absorption |
| 17B | NH4OH | 2.19 | 26 | 6 | 25 | 0 | 94.8 | 6.83 | 6.93 | Slight drop in range, no ammonia smell |
| 17C | KOH | 2.59 | 26 | 2 | — | — |  | 5.58 | 5.60 | Good discharge; good reaction poor absorption |
| 17D | KOH | 2.96 | 26 | 0 | 24 | 10 | 94.7 | 6.75 | 6.67 | Good discharge; good reaction; poor absorption |
| 17E | KOH | 3.31 | 26 | 0 | 24 | 12 | 95.2 | 12.81 | 12.90 | Good discharge; good reaction |

TABLE I-continued

| Example | Base | Volume (gal) | Wt. Initial lb | Wt. Initial oz | Wt. Discharge lb | Wt. Discharge oz | % Discharge | pH(i) | pH(f) | Solid |
|---|---|---|---|---|---|---|---|---|---|---|
| 17F | NH4OH | 2.47 | 26 | 0 | 24 | 8 | 94.7 | 4.59 | 4.60 | No ammonia odor after application; fast reaction, poor absorption |
| 17G | NH4OH | 3.09 | 25 | 8 | 23 | 14 | 93.6 | 4.80 | 4.78 | Fast reaction |
| 18 | NaOH | — | — | | — | | — | 9.5 | 5.85 | Good |
| 19 | NaOH | — | — | | — | | — | 5.85 | 5.9 | Good - wet solid. |
| 20 | NaOH | — | — | | — | | — | 12.5 | 9.1 | Good - mild reaction-wet solid. |
| 21 | NaOH | — | — | | — | | — | 9.01 | 4.95 | Good soak up - wet solid - no visible reaction. |
| 22 | NaOH | — | — | | — | | — | 12.28 | 4.95 | Good soak up - wet solid - no visible reaction. |
| 23 | NaOH | — | — | | — | | — | 11.4 | 4.49 | Good soak up - wet solid - no visible reaction |
| 24 | NaOH | — | — | | — | | — | 11.9 | 5.62 | Very good dry solid, good reaction, and good soak up. |
| 25 | NaOH | — | — | | — | | — | 7.8 | 5.5 | Very dry, spongy solid, good soak up and good reaction. |
| 26 | NaOH | — | — | | — | | — | 12.0 | 9.1 | Wet solid, good soak-up and good reaction. |
| 27 | NaOH | 2 | 23.06 | | — | | 95.9 | 13.09 | 12.94 | Poor initial absorption until mixed; very liquid - solid after setting up; faster reaction without magnesium stearate. |
| 28 | NaOH | 1.86 | 23.2 | | — | | 93.4 | 11.41 | 13.5 | Very poor discharge, no distance; liquid in pan, little solid. |
| 29 | NaOH | 1.95 | 23.375 | | — | | 92 | 5.75 | 13 | Very poor discharge, no flow at end-long discharge time-stearate needed for flow to stop leaks. |
| 30 | NaOH | 1.9 | 24.5 | | — | | 92.3 | — | — | No reaction |
| 31 | NaOH | 1.83 | 24.5 | | — | | 90.3 | 6.78 | 14 | Heat evolution observed during discharge reacted before beginning to stir. |
| 32 | NaOH | 1.91 | 24.5 | | — | | 92.6 | 12.47 | 12.43 | Nozzle leaked. |

TABLE II

| Example | % Citric Acid | | Sieve Size 20 | 40 | 100 | 200 | 325 | PAN | BULK DENSITY |
|---|---|---|---|---|---|---|---|---|---|
| 11 | 75 | | — | 7.94 | 82.25 | 5.23 | 1.65 | 2.92 | 119 |
| 14 | 80 | | — | 8.86 | 86.24 | 3.10 | 0.24 | 1.56 | 120 |
| 12 | 75 | | — | 4.79 | 69.32 | 9.30 | 4.55 | 12.04 | 117 |
| 13 | 80 | | — | 8.03 | 84.49 | 3.99 | 0.66 | 2.83 | 119 |
| B12A-1 | 80 | | — | 4.72 | 89.50 | 3.58 | 0.28 | 1.92 | 113 |
| | | (AVERAGE DISCHARGE) | | | | | | | |
| 15 | 80 | 92.95 | — | 3.97 | 83.06 | 6.56 | 1.30 | 5.11 | 116 |
| 17 | 80 | 94.63 | 0.02 | 9.98 | 76.45 | 6.90 | 0.84 | 5.80 | 114 |
| 17A | 80 | 94.7 | 0.02 | 8.04 | 78.04 | 7.15 | 2.54 | 4.24 | 116 |
| 17F | 80 | 93.97 | — | 3.98 | 80.78 | 6.53 | 2.61 | 6.10 | 118 |
| | OVERALL | 94.08 | | | | | | | |
| 25A | 65 | | 0.06 | 18.56 | 76.3 | 3.5 | 1.5 | 0.90 | 126 |

What is claimed is:

1. A device for the treatment of hazardous alkali spills having a means for dispensing under pressure in a collimated, directable stream, a dry fluidized particulate composition comprising, based on the total weight of the composition:
   A. about 45% to 80% by weight of an organic neutralizing acid selected from the group, consisting of citric acid, fumaric acid, tartaric acid, benzoic acid or mixtures thereof;
   B. about 5% to 45% by weight of a first absorptive clay having an absorbant capacity of about 60% to 90% by weight of water selected from the group consisting of attapulgite, perlite and fullers earth;
   C. about 0.5% to 10% by weight of a water soluble weak acid salt, the reaction product of a base and a weak acid; and
   D. the composite having a particle size in the range of −40 to +200 Tyler screen mesh size.

2. A device according to claim 1 where in the composition further comprises:
   E. about 10% to 45% weight of a second absorptive clay having an absorbant capacity of about 33.8% to 51% by weight of water selected from the group consisting of attapulgas clay, mica, and bentonite.

3. A device according to claim 2 wherein the second absorptive clay is attapulgas clay.

4. A device according to claim 1 wherein the water soluble weak acid salt is selected from the group consisting of sodium dihydrogen phosphate, magnesium stearate, sodium stearate, aluminum octoate, tricalcium phosphate, monosodium dimethylnaphthalene sulfonate.

5. A device according to claim 1 wherein the composition comprises 65% by weight of citric acid, 18% by weight of fumaric acid, 15.0% by weight of attapulgite clay, 2.0% by weight of a modified starch, and 0.5% by weight of monosodium dimethylnaphthalene sulfonate.

6. A device according to claim 1 wherein the composition comprises: about 70% by weight of citric acid; about 15% by weight of colloidal attapulgite clay; about 10% by weight of attapulgus clay; and about 5% by weight of sodium dihydrogen phosphate.

7. A method of treating hazardous alkali waste spills by using a device according to claim 1 and then removing the solid formed.

8. A method of treating hazardous alkali waste spills by using a device according to claim 2 and then removing the solid formed.

9. A method of treating hazardous alkali waste spills by using a device according to claim 3 and then removing the solid formed.

10. A method of treating hazardous alkali waste spills by using a device according to claim 4 and then removing the solid form.

11. A method of treating hazardous alkali waste spills by using a device according to claim 5 and then removing the solid formed.

12. A method of treating hazardous alkali waste spills by using a device according to claim 6 and then removing the solid formed.

13. A method of treating hazardous alkali waste according to claim 11 wherein the device is used at a distance of about 10 to 15 feet from the spill.

14. A method of treating hazardous alkali waste according to claim 12 wherein the device is used at a distance of about 10 to 15 feet from the spill.

15. A device according to claim 1 wherein the first absorptive clay is colloidal attapulgite clay.

* * * * *